United States Patent
Zhu (10) Patent No.: US 6,990,526 B1
(45) Date of Patent: Jan. 24, 2006

(54) METHOD AND APPARATUS FOR WEB CACHING

(75) Inventor: Michael Zhu, San Jose, CA (US)

(73) Assignee: PointRed Technologies, Inc., San Jose, CA (US)

(*) Notice: Subject to any disclaimer, the term of this patent is extended or adjusted under 35 U.S.C. 154(b) by 882 days.

(21) Appl. No.: 09/863,550

(22) Filed: May 22, 2001

Related U.S. Application Data (60) Provisional application No. 60/205,913, filed on May 22, 2000.

(51) Int. Cl.
*G06F 3/00* (2006.01)

(52) U.S. Cl. ............... 709/227; 709/203; 709/224; 713/166

(58) Field of Classification Search ........... 709/201, 709/204, 225, 228, 227, 203, 224, 220; 707/3, 707/201; 711/141, 124; 713/166, 163; 705/8, 705/10
See application file for complete search history.

(56) References Cited

U.S. PATENT DOCUMENTS

| | | | | |
|---|---|---|---|---|
| 5,581,704 A | * | 12/1996 | Barbara et al. | 711/141 |
| 5,754,774 A | * | 5/1998 | Bittinger et al. | 709/203 |
| 5,787,470 A | * | 7/1998 | DeSimone et al. | 711/124 |
| 5,859,971 A | * | 1/1999 | Bittinger et al. | 709/203 |

(Continued)

FOREIGN PATENT DOCUMENTS

| | | |
|---|---|---|
| WO | WO00/63800 | 10/2000 |

*Primary Examiner*—Khanh Quang Dinh
(74) *Attorney, Agent, or Firm*—Justin F. Boyce; Dechert LLP (57) ABSTRACT

A method and apparatus for web caching is disclosed. The method and apparatus may be implemented in hardware, software or firmware. Complementary cache management modules, a coherency module and a cache module(s) are installed complementary gateways for data and for clients respectively. The coherency management module monitors data access requests and or response and determines for each: the uniform resource locator (URL) of the requested web page, the URL of the requestor and a signature. The signature is computed using cryptographic techniques and in particular a hash function for which the input is the corresponding web page for which a signature is to be generated. The coherency management module caches these signatures and the corresponding URL and uses the signatures to determine when a page has been updated. When, on the basis of signature comparisons it is determined that a page has been updated the coherency management module sends a notification to all complementary cache modules. Each cache module caches web pages requested by the associated client(s) to which it is coupled. The notification from the cache management module results in the cache module(s) which are the recipient of a given notice updating their tag table with a stale bit for the associated web page. The cache module(s) use this information in the associated tag tables to determine which pages they need to update. The cache modules initiate this update during intervals of reduced activity in the servers, gateways, routers, or switches of which they are a part. All clients requesting data through the system of which each cache module is a part are provided by the associated cache module with cached copies of requested web pages.

18 Claims, 7 Drawing Sheets

U.S. PATENT DOCUMENTS

| | | | |
|---|---|---|---|
| 5,862,325 A * | 1/1999 | Reed et al. | 709/201 |
| 5,867,661 A * | 2/1999 | Bittinger et al. | 709/227 |
| 5,878,213 A * | 3/1999 | Bittinger et al. | 709/203 |
| 6,029,175 A | 2/2000 | Chow et al. | 707/104 |
| 6,128,701 A | 10/2000 | Malcolm et al. | 711/133 |
| 6,192,398 B1 | 2/2001 | Hunt | |
| 6,216,212 B1 | 4/2001 | Challenger et al. | 711/163 |
| 6,219,676 B1 * | 4/2001 | Reiner | 707/201 |
| 6,549,935 B1 * | 4/2003 | Lapstun et al. | 709/204 |
| 6,760,719 B1 * | 7/2004 | Hanson et al. | 707/3 |

* cited by examiner

| Gateway | URL |
|---|---|
| www.Gateway 120 | "www. page 1.com" |
| www.Gateway 140 | "www. page 2.com" |
| www.Gateway 160 | "www. page 3.com" |
| www.Gateway... | "www. page 4.com" |

FIG. 2B

| URL | SIGNATURE | STATUS |
|---|---|---|
| "www. page 1.com" | SIG 1 | Current |
| "www. page 2.com" | SIG 2 | Stale |
| "www. page 3.com" | SIG 3 | Current |
| "www. page 4.com" | SIG 4 | Current |
| "www. page 10.com" | SIG 4 | Current |

| URL | STATUS |
|---|---|
| "www.page1.com" | Current |
| "www.page2com" | Stale |
| "www.page2.com" | Current |
| "www.page2.com" | Current |

FIG. 3B

FIG. 4          DataCenter Gateway

FIG. 5  Client Gateway

METHOD AND APPARATUS FOR WEB CACHING

CROSS-REFERENCE TO RELATED APPLICATION

This application claims priority from Provisional Application No.: 60/205,913 entitled "SYSTEM AND APPARATUS FOR IMPLEMENTING WEB CACHE" filed on May 22, 2000 which is incorporated herein by reference in its.

BACKGROUND OF THE INVENTION

1. Field of the Invention

The invention relates to computer networks and more particularly to an apparatus and method for caching web pages.

2. Description of the Related Art

Caching is a methodology which has been applied with great advantage in devices ranging from computers, peripheral devices, and web browsers. Caching involves maintaining copies of recently used data in an alternate memory location to the main memory in which the original data is stored. This alternate memory location is identified as a cache memory. Cache policies have been developed to deal with the issues surrounding the identification and resolution of a lack of coherance between the copy of a set of data in cache memory and the original data in main or other source memory. Foremost among these policies is the concern with identifying data that no longer corresponds with the corresponding data in main or source memory. Such data in cache memory is said to be non-coherant, stale, or old data.

In closely coupled systems such as computers, elaborate cache policies have been developed which deal with maintenance of coherancy between the copy in cache memory and the source data in main memory. Only recently has there been an interest in applying cache methodoligies to loosely coupled systems. A primary area of such interest involves the Internet. Current browsers maintain the last five or ten web pages in cache memory. The presence of this cache capability in browsers provides users faster access to recently viewed data. With the relatively long download times required for a web page this is no small advantage. There are however drawbacks to a browser cache. The cache is shallow, i.e. maintains only the last five or ten web pages. This is typically only a fraction of the pages that a typical Internet user will frequently visit. A second drawback to a browser cache is that the cached pages are in many cases stale, old or out-dated, in that they do not maintain coherancy with the source pages delivered from the data center and associated web servers therein from which they were supplied.

What is needed is are improvements in the area of the caching of web pages.

SUMMARY OF THE INVENTION

The present invention provides a method and apparatus for web caching that does not require any changes to existing browsers or the computer platforms on which they run. Instead complementary cache management modules, a coherency module and a cache module(s) are installed complementary gateways for data and for clients respectively. The coherency management module is implemented at or near a data center, data source, Internet service provider (ISPs) or central office. Physically the coherency management module may be located in a server, gateway, router or switch.

The cache modules are installed at remote sites including, servers, proxy servers, gateways, routers or switches. The coherency management module monitors data access requests and or response and determines for each: the uniform resource locator (URL) of the requested web page, the URL of the requestor and a signature. The signature is computed using cryptographic techniques and in particular a hash function for which the input is the corresponding web page for which a signature is to be generated. Each signature is an extremely compact and unique identifier for the corresponding web page. A typical signature might require 100–200 bits for a web page that itself might require tens of thousands of bits for its storage.

The coherency management module caches these signatures and the corresponding URL and uses the signatures to determine when a page has been updated. When, on the basis of signature comparisons it is determined that a page has been updated the coherency management module sends a notification to all complementary cache modules. Each cache module caches web pages requested by the associated client(s) to which it is coupled. The notification from the cache management module results in the cache module(s) which are the recipient of a given notice updating their tag table with a stale bit for the associated web page. The stale bit indicates that the actual web page stored on or by the cache module is no longer current. The cache module(s) use this information in the associated tag tables to determine which pages they need to update. The cache modules initiate this update during intervals of reduced activity in the servers, gateways, routers, or switches of which they are a part. All clients requesting data through the system of which each cache module is a part are provided by the associated cache module with cached copies of requested web pages thus avoiding the delay associated with obtaining the originals of such pages from the data center or source.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention provides a method and apparatus for web caching that does not require any changes to existing browsers or the computer platforms on which they run. Instead complementary cache management modules, a coherency module and a cache module(s) are installed complementary gateways for data and for clients respectively. The coherency module is installed at or near the data source. One or more companion cache modules are installed at one or more remote sites. The coherency management module manages indirectly the tag tables maintained by each of the cache modules for the web pages which they, the cache modules have cached.

The coherency management module is implemented at or near a data center, data source, Internet service provider (ISPs) or central office. Physically the coherency management module may be located in a server, gateway, router or switch. The cache modules are installed at remote sites including, servers, proxy servers, gateways, routers or switches. The coherency management module monitors data access requests and or response and determines for each: the uniform resource locator (URL) of the requested web page, the URL of the requestor and a signature. The signature is computed using cryptographic techniques and in a particular embodiment of the invention, a hash function for which the input is the corresponding web page for which a signature is to be generated. Each signature is an extremely compact and unique identifier for the corresponding web page. A typical signature might require 100–200 bits for a web page that itself might require tens of thousands of bits for its storage.

A range of hash algorithms may be used for this purpose including: Secure Hash Algorithm (SHA), Message Digest (MDx) for example. The signature has the property that no two web pages will generate the same signature, and further that two versions of the same web page differing in a small portion of their content will not generate the same signature. Each signature is an extremely compact identifier for the corresponding web page, requiring for example in the case of SHA only 160 bits for a web page that may include $2^{64}$ bits.

The coherency management module caches these signatures and the corresponding URL and uses the signatures to determine when a page has been updated. When, on the basis of signature comparisons it is determined that a page has been updated, the coherency management module sends a notification to all complementary cache modules. Each cache module caches web pages requested by the associated client(s) to which it is coupled. The notification from the cache management module results in the cache module(s) which are the recipient of a given notice updating their tag table with a stale bit for the associated web page. The stale bit indicates that the actual web page stored on or by the cache module is no longer current. The cache module(s) use this information in the associated tag tables to determine which pages they need to update. The cache modules initiate this update during intervals of reduced activity in the servers, gateways, routers, or switches of which they are a part.

All clients requesting data through the device of which each cache module is a part are provided by the associated cache module with cached copies of requested web pages which are coherent when such pages have been cached. This avoids the delay associated with obtaining the originals of such pages from the data center or source, and assures their coherency.

Figure 1:
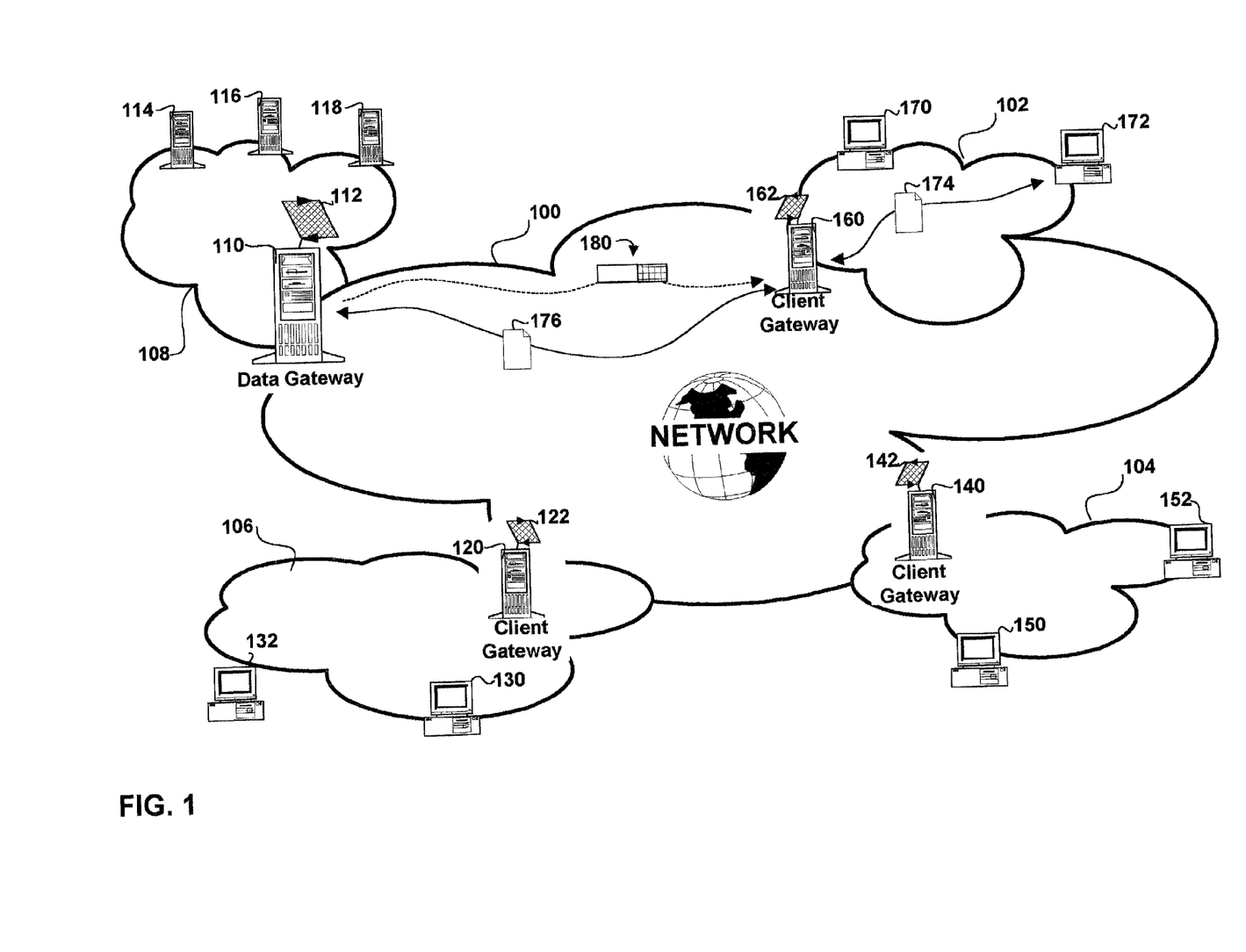
FIG. 1 shows an overall system environment with a cache management module located at a data gateway interfacing across a network with a plurality of cache modules located at remote client gateways.

FIG. 1 shows an overall system environment with a cache management module located at a data gateway interfacing across a network with a plurality of cache modules located at remote client gateways. A data gateway 110 is shown coupled across a network 100 with client gateways 120, 140 and 160. The data gateway couples across a network 108 with a plurality of data sources, which in the example shown are servers 114, 116 and 118. The data gateway may comprise a server, gateway, router or switch for example. A cache coherency management module (See FIG. 2A) on the data gateway runs processes 112 shown in FIG. 4 for maintaining cache coherency between the web pages cached by each of the cache modules (See FIG. 3A) on the client gateways and the corresponding original web pages provided by corresponding ones of the data sources 114–118.

Client gateway 160 includes a cache module (See FIG. 3A) which runs processes 162 (See FIG. 5) for maintaining a cache of web pages for clients 170–172 to which it is coupled via network 102. Client gateway 140 includes a cache module (See FIG. 3A) which runs processes 142 (See FIG. 5) for maintaining a cache of web pages for clients 150–152 to which it is coupled via network 104. Client gateway 120 includes a cache module (See FIG. 3A) which runs processes 122 (See FIG. 5) for maintaining a cache of web pages for clients 130–132 to which it is coupled via network 106.

Each request for a web page by any of clients 170–172, 150–152 and 130–132 is honoured either by delivery of the web page from the associated cache module within the corresponding one of the cache modules of client gateways 120, 140, 160 or the retrieval of the web page from the corresponding one of servers 114–118. The client gateway 160 is shown delivering web page 174 to client 172. That web page may either come from the associated cache module or the associated one of servers 114–118. The coherency processes 112 on the data gateway 110 are shown delivering an update message 180 to the cache module of client gateway 160. Responsive to the receipt of the update message the cache module initiates a request for an updated copy of the web page 176 which is in need of an update from the associated one of servers 114–118. The update determination is made by coherency processes 112 of the coherency module on data gateway 110 from monitoring of requests for that page from any clients accessing the associated one of servers 114–118.

Figure 2A:
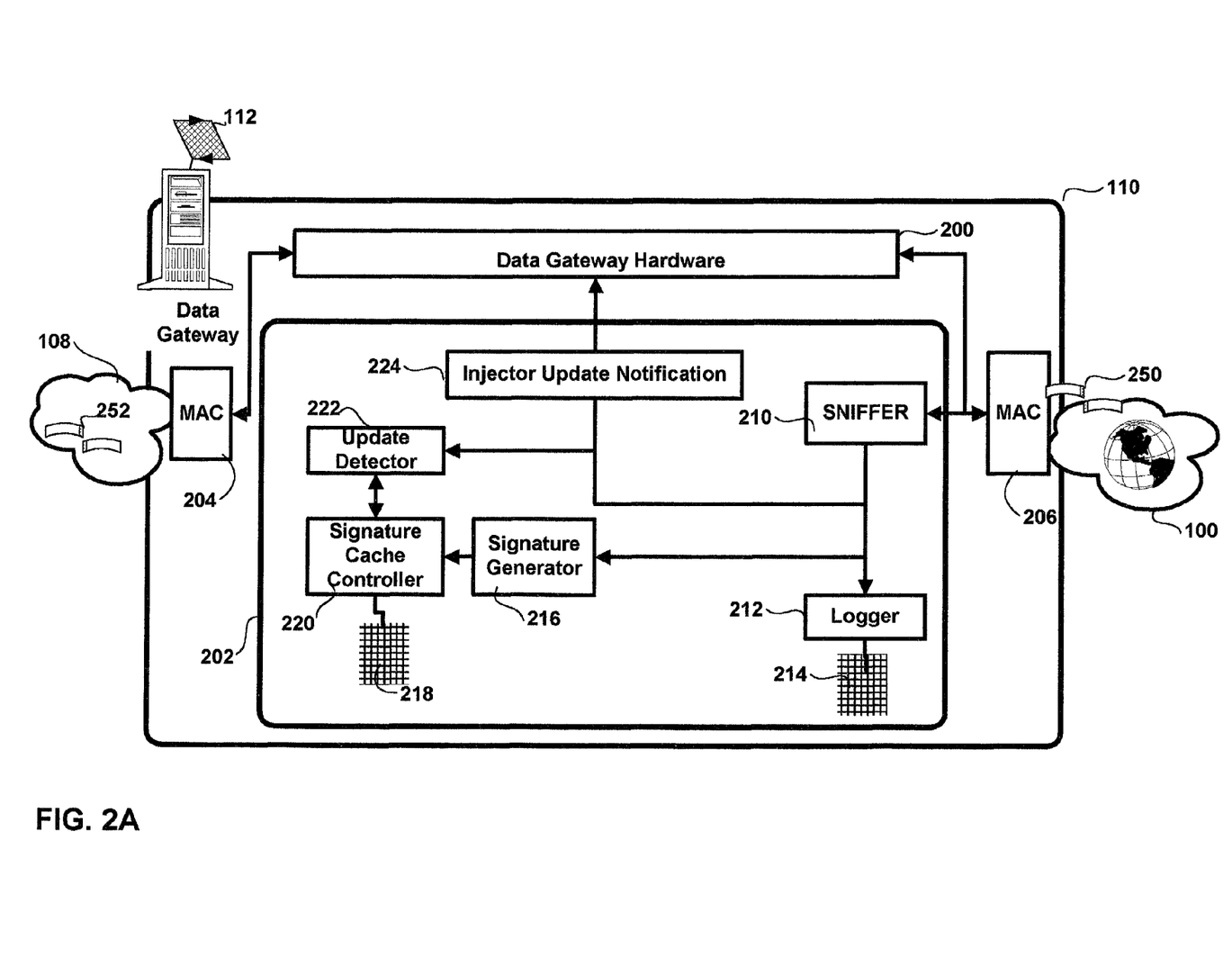
FIG. 2A is a hardware block diagram of the data gateway and the coherency management module located therein.
Figure 4:
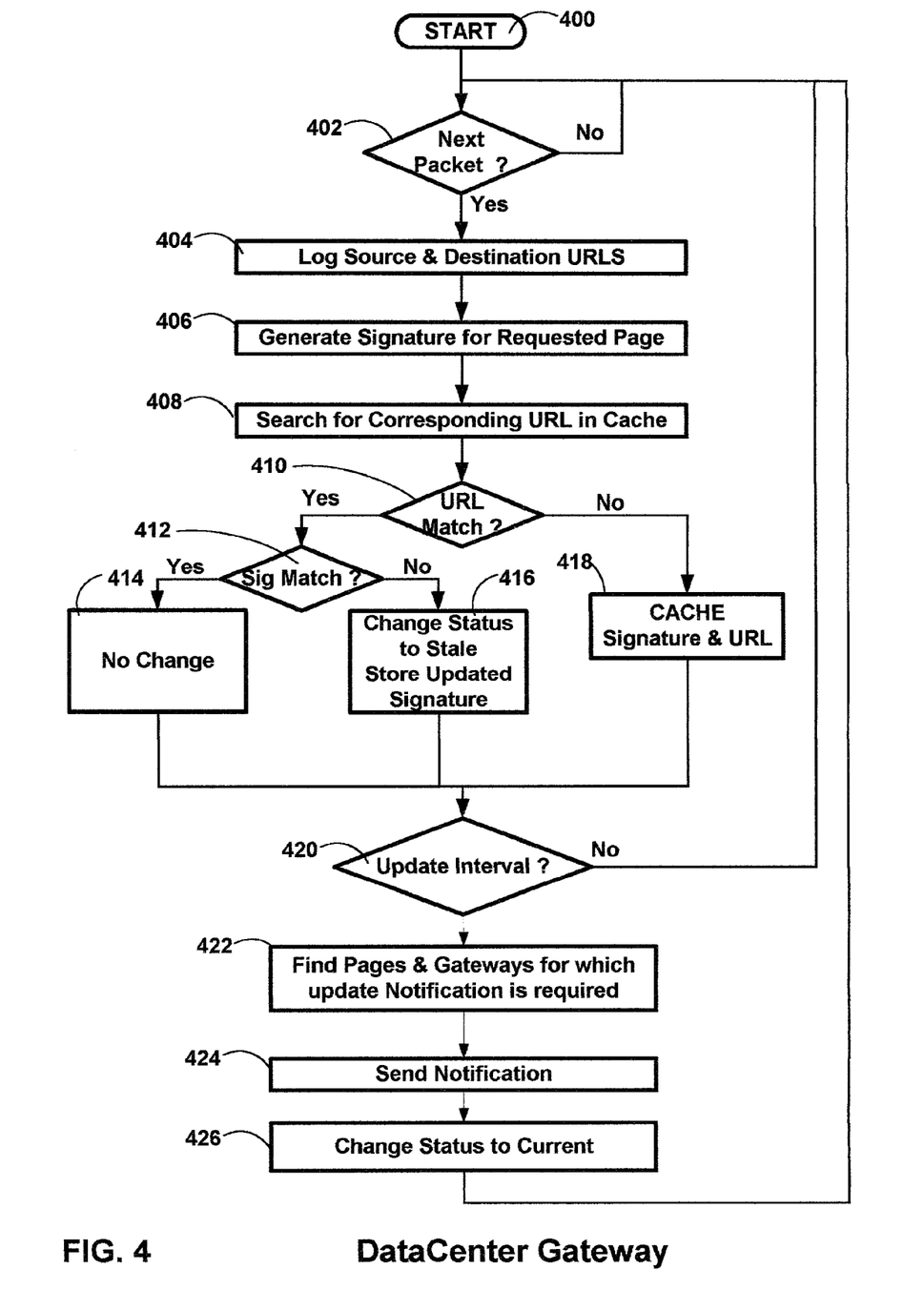
FIG. 4 is a process flow diagram of the processes implemented by the coherency management module shown in FIG. 2A.

FIG. 2A is a hardware block diagram of the data gateway 110 and the coherency management module 202 located therein which implements processes 112 shown in FIG. 4 for maintaining cache coherency on each of the cache modules of the client gateways 120, 140, 160 shown in FIG. 1. The data gateway includes a hardware block 200 which includes the traditional hardware associated with the corresponding gateway type, e.g. server, gateway, router or switch for example. Medium access controls (MACS) 204 and 206 couple the data gateway hardware to networks 108 and 100 respectively. The coherency management module 202 includes a sniffer 210, a logger 212, a signature generator 216, a signature cache controller 220, an update detector 222 and an update notification injector 224. The sniffer monitors either or both incoming or outgoing packets 250–252 to determine the pages requested and the destination address for the web pages. At no time does the sniffer interfere with the delivery of requests for web pages or the delivery of those pages by the data gateway.

The sniffer monitors all requests for web pages including those passing through one of the client gateways shown in FIG. 1. Those requests from a client coupled to the data gateway through a client gateway are recorded by the logger 212 in an associated request log 214 shown in detailed view in FIG. 2B. All requests including the above and whether or not there is an associated gateway may be passed to the signature generator as well. The signature generator processes the web page to produce a signature. A signature has the property that it is a unique and compact identifier of the web page. A typical signature might require 100–200 bits for a web page that itself might require tens of thousands of bits for its storage. A range of hash algorithms may be used for this purpose including: Secure Hash Algorithm (SHA), Message Digest (MDx) for example. The signature has the property that no two web pages will generate the same signature, and further that two versions of the same web page differing in a small portion of their content will not generate the same signature. Each signature is an extremely compact identifier for the corresponding web page, requiring for example in the case of SHA only 160 bits for a web page that may include $2^{64}$ bits.

Figure 2B:
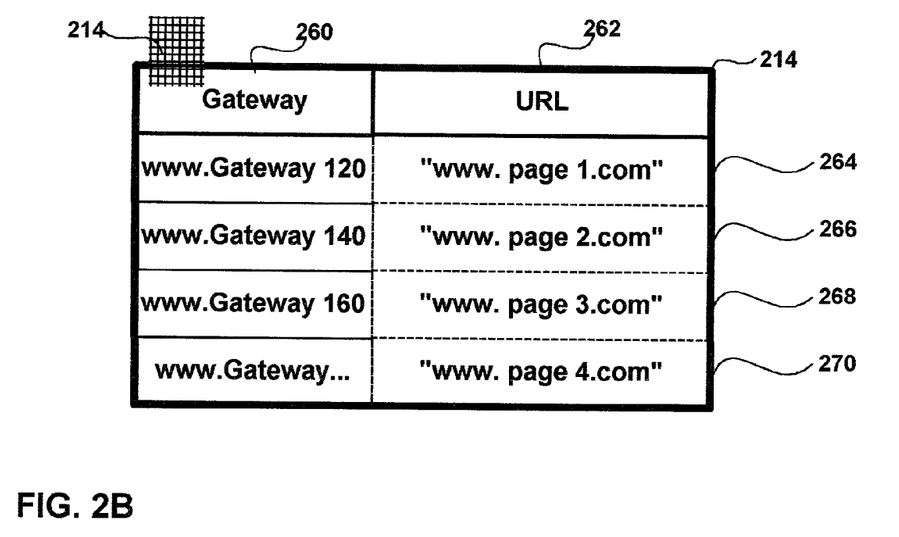
FIGS. 2B–C show various data structures maintained by the coherency management module shown in FIG. 2A.
Figure 2C:
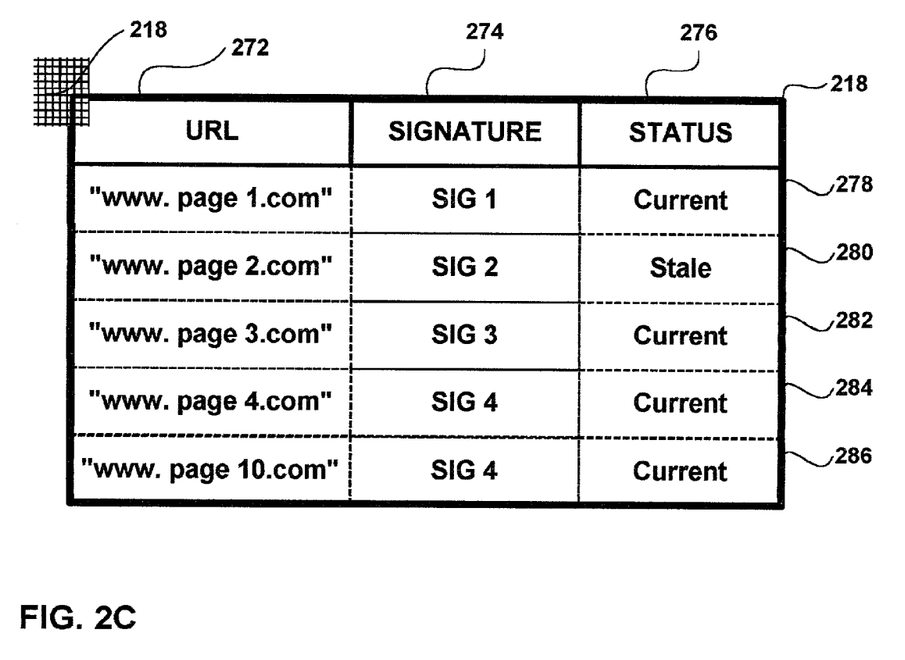

The signature generator passes the signature and the corresponding URL to the cache controller 220 which stores them in signature table 218 shown in detail in FIG. 2C. When successive signatures for the same web page, identified by the same URL differ the cache controller loads the new signature into the associated row of the signature table and changes a status bit associated with the web page to indicate associated web page is stale or out of date. The update module instantaneously or periodically determines on the basis of the status bit which URLS are stale. The update detector then determines from the log table 214 what the associated client gateway(s) is/are. Then this information is passed to the injector 224 to send an update packet 180 (See FIG. 1) to the associated cache modules in each corresponding gateway. The effect of this notice is that the tag table in each cache module will be updated to indicate which web pages are stale. The cache module will then schedule and request an updated copy of the associated web page from the associated one of the servers 114–118. The amount of data stored by the coherency management module is extremely compact due to the fact that no web pages are stored, only signatures. Periodically using time stamps (not shown) the least recently used entries in the log table 214 and the signature table 218 are purged to limit the size of the data storage requirement for the data gateway 202.

FIGS. 2B–C show various data structures maintained by the coherency management module shown in FIG. 2A. The structures shown are the log table 214 and the signature table 218. The log table includes fields 260 and 262 for recording the gateway URL and the URL of the requested web page respectively. Records 264–270 are shown. The signature table includes fields 272, 274, 276 for recording the URL of the requested web page, the latest signature for the page and the status bit for that page respectively. Records 278–286. In an embodiment of the invention the signature table includes records, i.e. record 286 for web pages requested by clients coupled to the data gateway by means other than an associated client gateway and cache module. A possible benefit of collecting this information as well is that the pages requested by these clients may overlap with the pages requested by gateway coupled clients thus increasing the statistical likelihood of making a timely update determination for a web page.

Figure 3A:
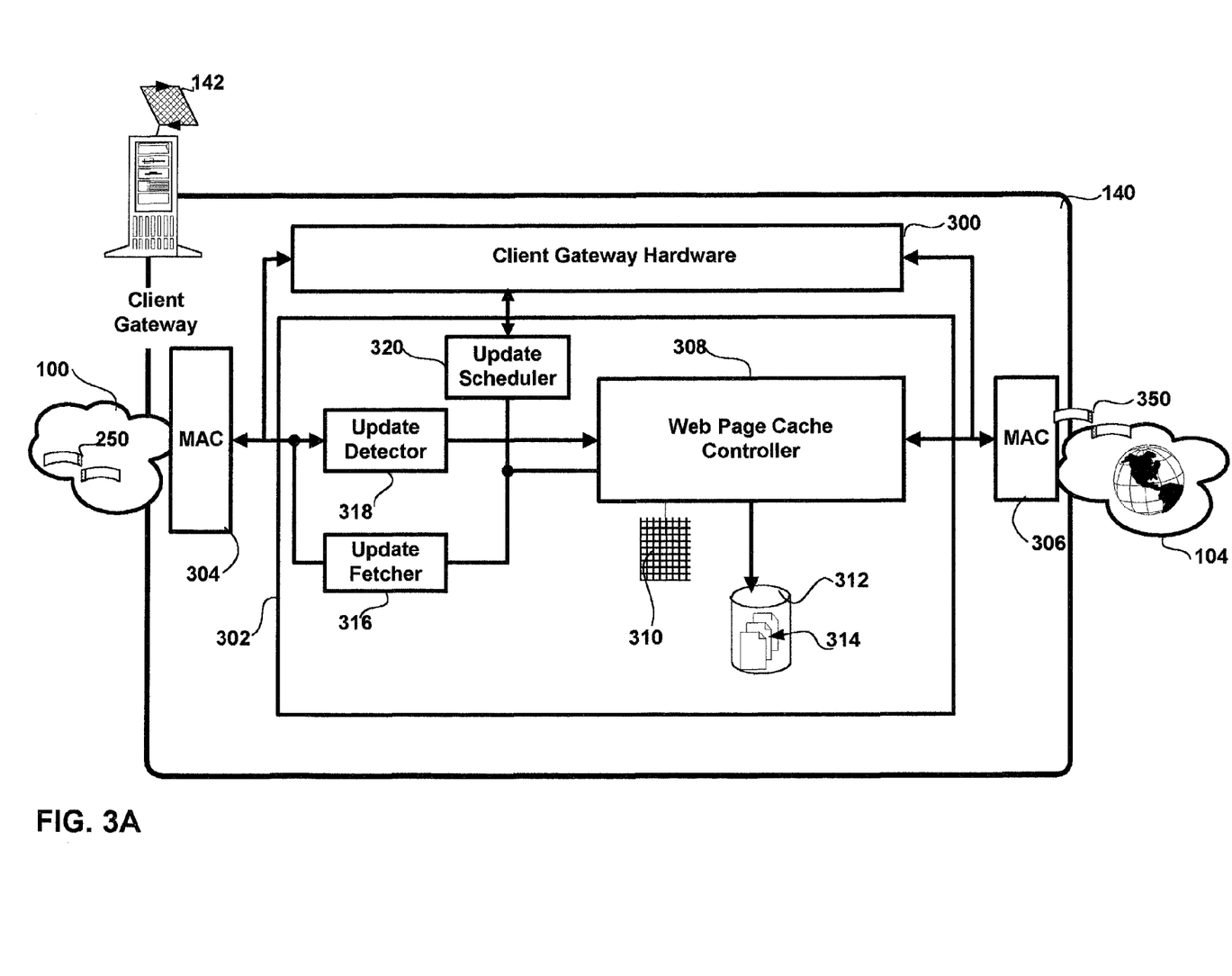
FIG. 3A is a hardware block diagram of a remote client gateway and the cache module located therein.
Figure 5:
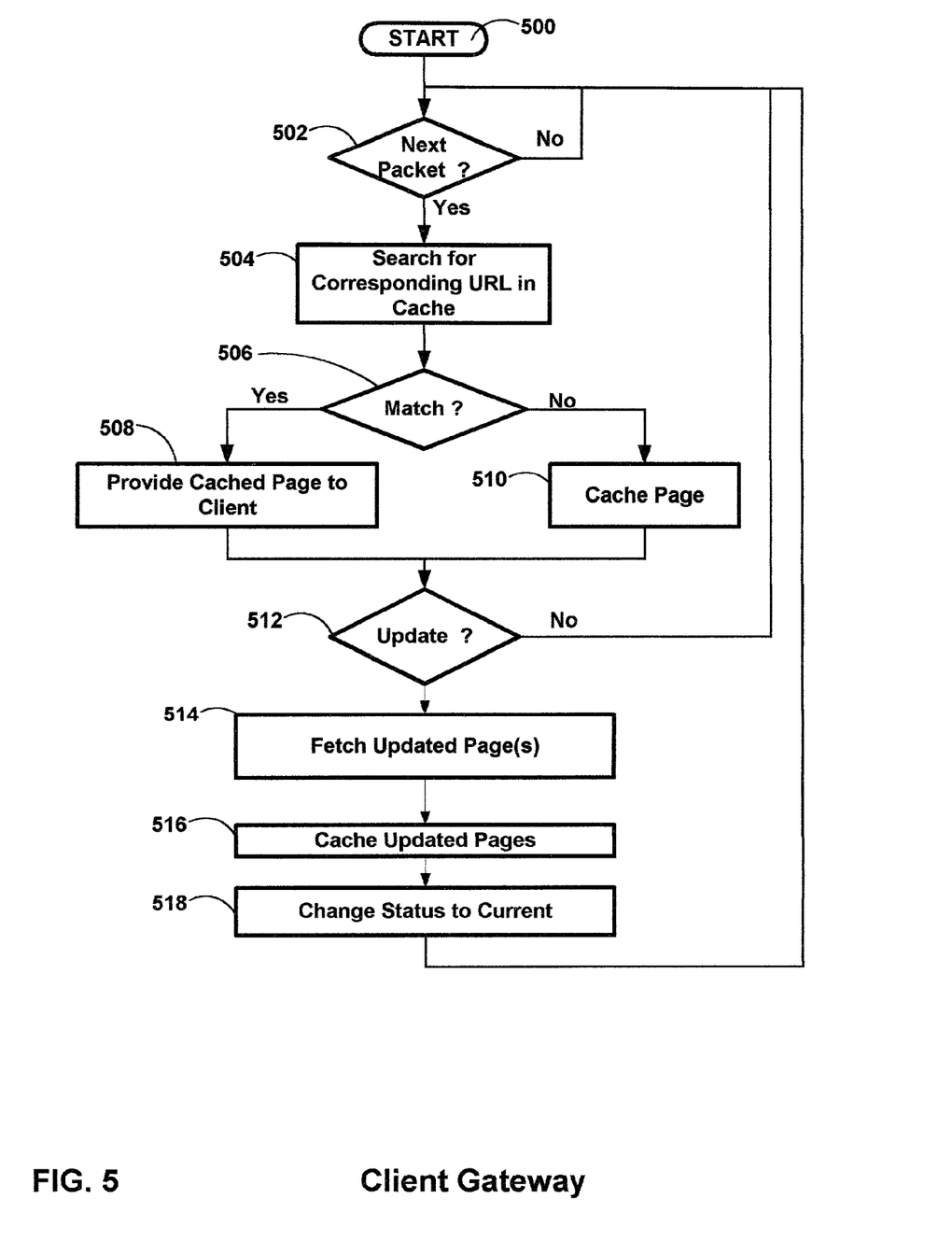
FIG. 5 is a process flow diagram of the processes implemented by the cache module shown in FIG. 3A.

FIG. 3A is a hardware block diagram of a remote client gateway 140 and a representative cache module 302 located therein which implements processes 142 shown in FIG. 5 for maintaining a cache for the associated clients 150–152 coupled to the client gateway. The client gateway includes a hardware block 300 which includes the traditional hardware associated with the corresponding gateway type, e.g. server, gateway, router or switch for example. Medium access controls (MACS) 304 and 306 couple the client gateway hardware to networks 100 and 104 respectively. The cache module 302 includes a web page cache controller 308, a update detector 318, an update scheduler 320, and an update fetcher 316. The web page cache controller couples to memory 312 for storage of cached web pages 314. The web page cache controller monitors request packets 350 from the clients 150–152 for web pages. If the requested page is in cache and is not stale the controller provides the page to the client. If the page is not in cache the request is passed along and the responsive packet which contains the web page is detected and cached in memory 312 by the controller. The controller maintains a tab table 310 (See FIG. 3B). That table lists for each of the stored web pages the URL and the status, e.g. stale or current. The status field is updated in the following manner. When an update message, e.g. message 180 (See FIG. 1) is received from the coherency manager by the update detector 318 the URL of the stale page which is the subject of the update is passed to the controller 308 and the status field for the associated page is changed to "Stale". Next, the update scheduler 320 determines that bandwidth requirements or processing activity for the client gateway 140 is low. When such an interval is indicated the update fetcher queries the tag table 310 to determine what the URLs are for the pages which are stale. Then the fetcher requests such pages from the associated server 114–118 and upon receipt passes them to the cache controller 308. The cache controller stores them and removes the stale bit from the associated status field. Thus, the coherency of the web pages 314 cached by cache module 302 is maintained by remote management of tag table 310 by the data gateway's coherency management module 202 (See FIG. 2A).

Figure 3B:
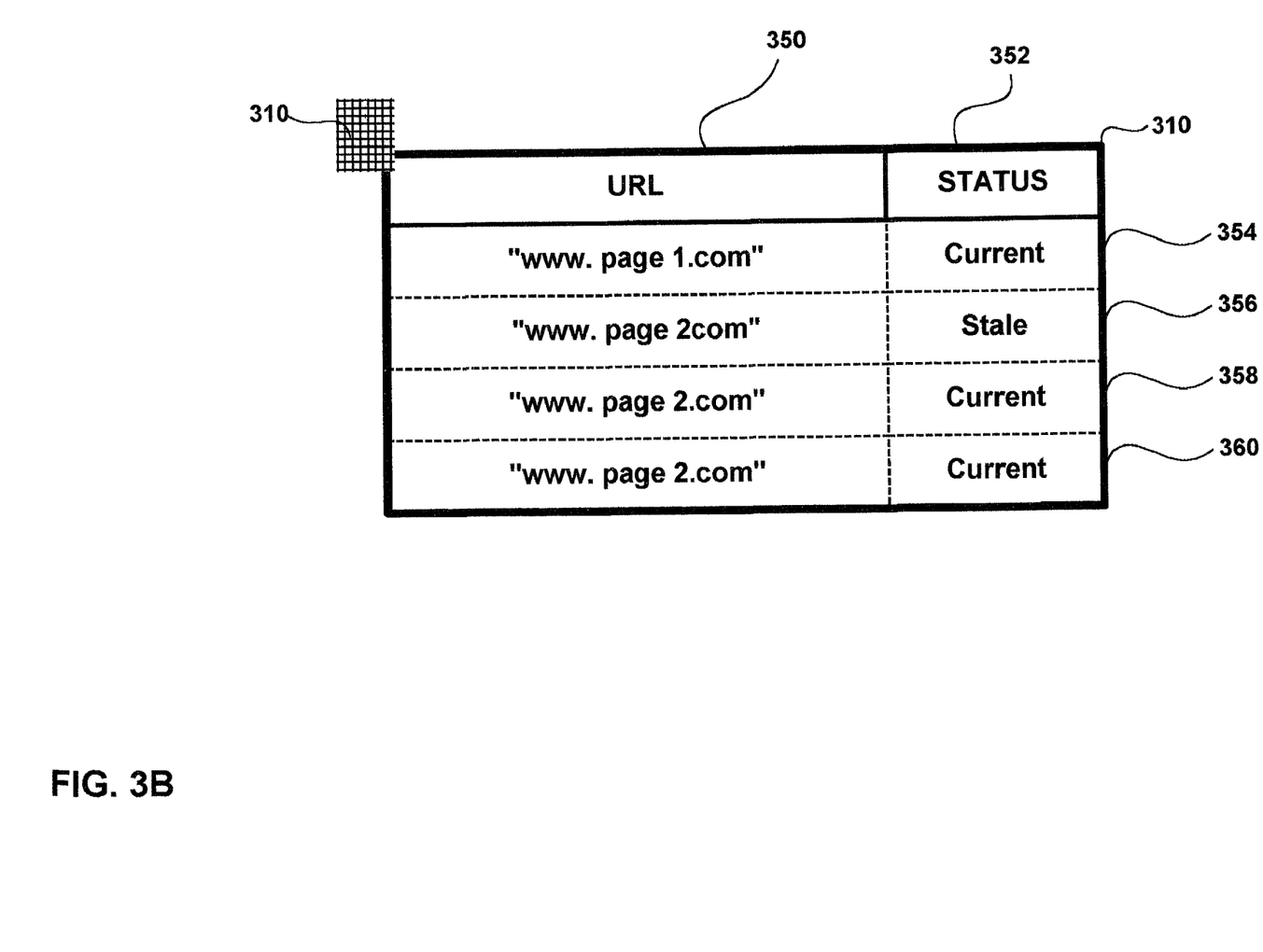
FIG. 3B shows various data structures maintained by the cache module shown in FIG. 3A.

FIG. 3B shows various data structures maintained by the cache module shown in FIG. 3A. The structures include the tag table 310. The tag table includes fields 350–352 for recording the URL and the status bit for each of the cached web pages. Records 354–360 are shown.

FIG. 4 is a process flow diagram of the processes implemented by the coherency management module shown in FIG. 2A. After initialization in start block 400 control is passed to decision process 402 for a detection of the next packet either request or response. When the next packet is received control passes to process 404 in which the source and destination URLS are recorded in the log table for those requests coming via a client gateway. Then in process 406 a signature is generated for the requested web page. Next in process 408 a search is conducted by the signature cache controller 220 (See FIG. 2A) to determine whether a prior signature for the web page exists. If in decision process 410 a matching URL is found in the signature cache table 218 control is passed to decision process 412. In decision process 412 a determination is made as to whether the signature matches the prior signature for the page. If it does then control passes via no change process 414 directly to decision process 420. If alternately a determination is made that the new signature for the URL and the old signature in the signature cache table 218 do not match then control passes to process 416 in which the status for the associated record is set to "stale" and the new signature replaces the old. Subsequently control passes to decision process 420. If alternately, in decision process 410 a determination is made that the URL of the page for which a new signature has been generated does not match any URL in the signature table then control passes to process 418 in which the new record, i.e. signature and associated URL is recorded in the signature table. Then control passes to decision proess 420.

In decision process 420 a determination is made as to whether an update interval is indicated. That decision made by the update detector, may be instantaneous upon detection of a stale record in the signature table or may be delayed to coincide with an idle or low bandwidth interval of the data gateway. In any event, when an update interval is indicated control passes to process 422. In process 422 the records in the signature table which are stale are correlated with the associated URLS in the log table 214 to determine the gateway URL for each of the pages which are stale. Then in process 424 a notification message 180 for the target cache modules on the associated client gateways is injected into the output stream from the data gateway. Next in process 426 the status bits for the associated records in the signature cache table for which update notifications has been sent are changed from "stale" to current and control returns to decision process 402 for processing of the next requested web page.

FIG. 5 is a process flow diagram of the processes implemented by the cache module shown in FIG. 3A. After a start block 500 in which the system is initialized control is passed for detection of the next packet in decision process 502. Upon such detection control is passed to process 504 in which a search is conducted by the cache controller 308 (See FIG. 3A) for the requested web page. If in decision process 506 a matching URL is located then control is passed to process 508 in which the cached page is provided by the controller to the requesting client. Next control is passed to decision process 512. Alternately, if no matching page is found the request is passed to the associated data server 114–118 via the data gateway and the web page received in response thereto is cached in the cache memory 312. Next control is passed to decision process 512.

In decision process 512 a determination is made as to whether an update interval is indicated. Updating may be carried out instantaneously upon receipt of an update message or in a delayed manner. If an update message has been received and an update interval is indicated then control passes to process 514 in which the associated web page is fetched via a request initiated by the cache module fetcher 316. Next upon receipt of the page in process 516 the received web page is passed to the cache controller 308 (See FIG. 3A) and stored in cache memory 312 in replacement of the stale page. Then in process 518 the status bit for the associated tag record is updated from stale to current. Then control returns to decision process 502 for the processing of the next request/response.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

I claim:

1. A system for caching of data for a plurality of clients coupled to at least one data source with data resources each identified by a corresponding uniform resource locator (URL); and the system comprising:
    at least one cache module coupled to selected clients among the plurality of clients to cache data resources requested by the selected clients along with corresponding URLs, and the at least one cache module responsive to update messages identifying URLs of data resources requiring an update, to tag cached copies of the data resources identified in the update messages with a "stale" tag to indicate a lack of coherency between the cached copies and originals of the data resources in the at least one data source;
    a coherency management module coupled to the at least one data source to monitor data resource copies supplied by the at least one data source in response to requests by the selected clients and to send to the at least one cache module the update messages identifying each URL for which successive requested copies of the corresponding data resource differ from one another;
    wherein the at least one cache module includes a first cache module coupled to a first set of selected clients among the plurality of clients and a second cache module coupled to a second set of selected clients among the plurality of clients; and
    wherein further the coherency management module includes:
        a logger to maintain a log table which correlates the first cache module with the URLs requested by the first set of selected clients and the second cache module with the URL's requested by the second set of selected clients;
        a signature generator to generate a digital signature for each data resource copy supplied by the at least one data source in response to requests by the first and the second sets of selected clients;
        a signature cache to cache the digital signatures generated by the signature generator along with corresponding URLs and to tag with the stale tag each URL for which successive digital signatures for the corresponding data resource differ from one another; and
        an updater to send update messages to a corresponding one of the first and second cache module associated with URLs in the log table for which the corresponding signature in the signature cache includes the stale tag and the updater to remove the corresponding stale tags from the signature cache upon sending the update messages.

2. The system of claim 1, wherein the at least one cache module further comprises:
    an update fetcher to fetch an update from the at least one data source of cached copies tagged with a "stale" tag.

3. The system of claim 1, wherein the at least one cache module further comprises:
    an update scheduler to schedule data resource updates to correspond with an availability of the at least one cache module; and
    an update fetcher responsive to a data resource update scheduled by the update scheduler to fetch updates from the at least one data source of cached copies of the data resources marked with the "stale" tag.

4. The system of claim 1, wherein the coherency management module further comprises:
    a signature generator to generate a digital signature for each data resource copy supplied by the at least one data source in response to requests by the selected clients;
    a signature cache to cache the digital signatures generated by the signature generator along with corresponding URLs, and to tag with the stale tag each URL for which successive digital signatures for the corresponding data resource differ from one another; and
    an updater to send update messages to the at least one cache module for those digital signatures with corresponding URLs tagged with the stale tag and to remove the corresponding stale tags from the signature cache upon sending the update messages.

5. The system of claim 4, wherein the digital signature comprises a hash of the corresponding data resource.

6. The system of claim 1, wherein the data resource comprises a web page.

7. The system of claim 1, with coherency management module located within at least one of a server, a gateway, a router and a switch, coupled to the data source.

8. The system of claim 1, wherein the at least one cache module comprises a plurality of cache modules each coupled to corresponding ones of the plurality of clients and each responsive to the update messages from the coherency management module to tag with the stale tag the corresponding cached copies of the data resources identified in the update messages.

9. A method for caching data for a plurality of clients coupled to at least one data source with data resources each identified by a corresponding uniform resource locators (URL); and the method comprising the acts of:

caching the data resources together with corresponding URLs requested by the selected clients among the plurality of clients;

generating update messages identifying in the requests from the selected clients each URL for which successive requested copies of the corresponding data resource supplied by the at least one data source differ from one another, wherein the generating act further comprises the acts of:

creating a digital signature for each data resource copy supplied by the at least one data source in response to requests from the selected clients;

caching the digital signatures created in the creating act together with a corresponding URL;

labeling with the "stale" tag each corresponding URL for which successive digital signatures cached in the act of caching digital signatures differ from one another;

producing update messages identifying each URL labeled with a stale tag in the act of labeling; and removing the stale tags from the URLs identified in the update messages produced in the act of producing; and tagging with a "stale" tag the cached copies of the data resources cached in the caching act and identified in the update messages generated in the generating act, and with the stale tag indicating a lack of coherency between the tagged cached copy and corresponding original of the data resource in the at least one data source.

10. The method of claim 9, further comprising the act of: fetching from the at least one data source updated copies of data resources cached in the caching act and tagged in the tagging act with a stale tag.

11. The method of claim 9, further comprising the acts of: scheduling data resource updates; and fetching in response to a data resource update scheduled in the scheduling act, updated copies from the at least one data source of data resources cached in the caching act and tagged in the tagging act with a stale tag.

12. The method of claim 9, wherein each digital signature created in the act of creating comprises a hash of the corresponding data resource copy.

13. The method of claim 9, wherein the caching act further comprises the act of:

storing the cached data resources together with corresponding URLs at discrete locations each associated with a corresponding subset of the selected clients among the plurality of clients.

14. The method of claim 13, wherein the generating act further comprises the acts of:

maintaining a log table which correlates each discrete location of cached data resources with the URLs requested by the corresponding subset of the selected clients associated with each discrete location;

creating a digital signature for each data resource copy supplied by the at least one data source in response to requests from the first and the second sets of selected clients;

caching the digital signatures created in the creating act together with a corresponding URL;

labeling with the "stale" tag each corresponding URL for which successive digital signatures cached in the act of caching digital signatures differ from one another;

producing update messages which identify URLs labeled with a stale tag in the act of labeling;

targeting update messages produced in the act of producing to the discrete locations using the log table maintained in the act of maintaining to correlate each URL identified in the update messages with at least one of the discrete locations; and removing the stale tags from the URLs identified in the update messages produced in the act of producing.

15. The method of claim 9, wherein the data resource comprises a web page.

16. Computer software, tangibly embodied in a computer-readable medium for caching data for a plurality of clients coupled to at least one data source with data resources each identified by a corresponding uniform resource locators (URL); and the software comprising instructions to perform the following operations:

caching the data resources together with corresponding URLs requested by the selected clients among the plurality of clients;

generating update messages identifying in the requests from the selected clients each URL for which successive requested copies of the corresponding data resource supplied by the at least one data source differ from one another, wherein the generating act further comprises the acts of:

creating a digital signature for each data resource copy supplied by the at least one data source in response to requests from the selected clients;

caching the digital signatures created in the creating act together with a corresponding URL; labeling with the "stale" tag each corresponding URL for which successive digital signatures cached in the act of caching digital signatures differ from one another;

producing update messages identifying each URL labeled with a stale tag in the act of labeling;

removing the stale tags from the URLs identified in the update messages produced in the act of producing; and tagging with a "stale" tag the cached copies of the data resources cached in the caching act and identified in the update messages generated in the generating act, and with the stale tag indicating a lack of coherency between the tagged cached copy and corresponding original of the data resource in the at least one data source.

17. The software of claim 16, further comprising instructions for:

fetching from the at least one data source, updated copies of data resources cached in the caching act and tagged in the tagging act with a stale tag.

18. The software of claim 16, further comprising instructions for:

scheduling data resource updates; and fetching in response to a data resource update scheduled in the scheduling act, updated copies from the at least one data source of data resources cached in the caching act and tagged in the tagging act with a stale tag.

* * * * *